United States Patent
Hasegawa et al.

(10) Patent No.: US 10,286,979 B2
(45) Date of Patent: May 14, 2019

(54) AIR CLEANER STRUCTURE OF SADDLE-RIDE TYPE VEHICLE

(71) Applicant: SUZUKI MOTOR CORPORATION, Hamamatsu-Shi, Shizuoka (JP)

(72) Inventors: Kei Hasegawa, Hamamatsu (JP); Kota Kezuka, Hamamatsu (JP); Koichi Tanaka, Hamamatsu (JP)

(73) Assignee: SUZUKI MOTOR CORPORATION, Hamamatsu-Shi (JP)

( * ) Notice: Subject to any disclaimer, the term of this patent is extended or adjusted under 35 U.S.C. 154(b) by 83 days.

(21) Appl. No.: 15/229,293

(22) Filed: Aug. 5, 2016

(65) Prior Publication Data

US 2017/0106942 A1    Apr. 20, 2017

(30) Foreign Application Priority Data

Oct. 15, 2015   (JP) ................................ 2015-203557

(51) Int. Cl.
    *B01D 46/30*      (2006.01)
    *B01D 50/00*      (2006.01)
    (Continued)

(52) U.S. Cl.
    CPC .......... *B62M 7/06* (2013.01); *F02M 35/0205* (2013.01); *F02M 35/02416* (2013.01); *F02M 35/10144* (2013.01); *F02M 35/162* (2013.01)

(58) Field of Classification Search
    CPC ........ B01D 46/30; B01D 50/00; B01D 46/10; B62D 61/02; B60K 13/02; B62K 11/08; F02B 75/22; F02M 35/02416
(Continued)

(56) References Cited

U.S. PATENT DOCUMENTS 4,484,651 A * 11/1984 Hattori .................... B62J 35/00
                                                               180/225
5,908,337 A * 6/1999 Mashiko ............... F02B 61/045
                                                           440/88 A
(Continued)

FOREIGN PATENT DOCUMENTS

EP             1995163 A1    11/2008
JP           S57150022 U    9/1982
(Continued)

OTHER PUBLICATIONS

Office Action dated Nov. 8, 2018 during the prosecution of German application No. 102016118299.0.

*Primary Examiner* — Amber R Orlando
*Assistant Examiner* — Minh Chau T Pham
(74) *Attorney, Agent, or Firm* — Troutman Sanders LLP

(57) ABSTRACT

A motorcycle is provided with an engine unit having a crankcase and a cylinder assembly protruding diagonally frontward and upward from the crankcase. An air cleaner box has a rearward-descending shape extending from the upper side to the rear side of the cylinder assembly as seen in a side view to form a vertically elongating box shape. The air cleaner box is disposed between left and right frames of a chassis, and both side surfaces of the air cleaner box are separated from the chassis. The air cleaner box has a frontward-narrowing and rearward-narrowing width as seen in a top view. As a result, it is possible to obtain a sufficient box capacity and facilitate a compact design. In addition, it is possible to smoothly flow an air stream in the lateral sides of the air cleaner box.

12 Claims, 8 Drawing Sheets

(51) Int. Cl.
*B01D 46/10* (2006.01)
*B62D 61/02* (2006.01)
*B60K 13/02* (2006.01)
*B62K 11/08* (2006.01)
*F02B 75/22* (2006.01)
*B62M 7/06* (2006.01)
*F02M 35/02* (2006.01)
*F02M 35/024* (2006.01)
*F02M 35/10* (2006.01)
*F02M 35/16* (2006.01)

(58) Field of Classification Search
USPC ....... 55/385.3, 498, 510, DIG. 28; 180/68.3, 180/219, 225, 226, 229, 68.1; 123/198 E, 123/54.4
See application file for complete search history.

(56) References Cited

U.S. PATENT DOCUMENTS

| | | | | |
|---|---|---|---|---|
| 6,287,354 B1 * | 9/2001 | Nozaki | ................. | B62D 61/02 180/219 |
| 6,325,169 B1 * | 12/2001 | Tateshima | ............... | F02B 61/02 180/219 |
| 7,438,738 B2 * | 10/2008 | Uneta | .................... | F02M 35/04 123/198 E |
| 7,637,242 B2 | 12/2009 | Koide et al. | | |
| 8,147,578 B2 * | 4/2012 | Bannister | ........... | B01D 46/2411 123/198 E |
| 2005/0051375 A1 * | 3/2005 | Momosaki | ....... | F02M 35/10013 180/219 |
| 2008/0308331 A1 | 12/2008 | Trunkenpolz et al. | | |
| 2009/0090090 A1 * | 4/2009 | Nishizawa | ......... | B01D 46/0005 55/290 |
| 2009/0241868 A1 * | 10/2009 | Morita | ................... | B62K 11/04 123/54.4 |
| 2013/0192912 A1 * | 8/2013 | Shimomura | ..... | F02M 35/02416 180/68.3 |

FOREIGN PATENT DOCUMENTS

| | | | | |
|---|---|---|---|---|
| JP | S60261732 A | 12/1985 | | |
| JP | 61261644 A1 * | 11/1986 | ................ | F02F 1/42 |
| JP | H06312680 A | 11/1994 | | |
| JP | H10196494 A | 7/1998 | | |
| JP | 2002202034 A | 7/2002 | | |
| JP | 2006037897 A | 2/2006 | | |
| JP | 2011012609 A | 1/2011 | | |

* cited by examiner

AIR CLEANER STRUCTURE OF SADDLE-RIDE TYPE VEHICLE

CROSS-REFERENCE TO RELATED APPLICATIONS

This application is based upon and claims the benefit of priority of the prior Japanese Patent Application No. 2015-203557, filed on Oct. 15, 2015, the entire contents of which are incorporated herein by reference.

BACKGROUND OF THE INVENTION

Field of the Invention

The present invention relates to an air cleaner structure of a saddle-ride type vehicle having an air cleaner box.

Description of the Related Art

In Japanese Laid-open Patent Publication No. 2002-202034, an air cleaner structure of a saddle-ride type vehicle is discussed. In this technique, a motorcycle has a chassis extending rearward from a head pipe, an engine disposed in a lower part of the chassis, an airbox disposed above the engine, and a fuel tank disposed at the rear of the airbox.

In Japanese Laid-open Patent Publication No. 10-196494, a motorcycle is discussed. In the motorcycle of this technique, the airbox is disposed between a pair of left and right main frames extending in the front-rear direction. In addition, the air box has a top portion protruding upward from the main frame and is housed in a concave portion formed on the bottom part of the fuel tank.

In Japanese Laid-open Patent Publication No. 2006-37897, a motorcycle is discussed. In this technique, the air cleaner is disposed above a cylinder head across front and rear banks of an engine body. In addition, the fuel tanks disposed to cover the engine body from the top at the rear of the air cleaner are supported by a rear frame.

Patent Document 1: Japanese Laid-open Patent Publication No. 2002-202034

Patent Document 2: Japanese Laid-open Patent Publication No. 10-196494

Patent Document 3: Japanese Laid-open Patent Publication No. 2006-37897

The air cleaner box requires various types of performance such as soundproofness, dustproofness, airtightness, and maintainability. For this purpose, various methods have been employed as in the techniques of the patent documents described above. However, there is a tradeoff relationship between a large box capacity and a compact design, and it is difficult to balance such a tradeoff relationship.

SUMMARY OF THE INVENTION

In view of the aforementioned problems, it is therefore an object of the present invention to provide an air cleaner box capable of obtaining a sufficient box capacity and implementing a compact design.

According to an aspect of the invention, there is provided an air cleaner structure of a saddle-ride type vehicle having an air cleaner box, wherein an engine unit provided with a crankcase and a cylinder assembly protruding diagonally frontward and upward from the crankcase is mounted to the saddle-ride type vehicle, the air cleaner box has a rearward-descending shape extending from an upper side to a rear side of the cylinder assembly as seen in a side view, and a maximum height of the air cleaner box is equal to or larger than a maximum length of a front-rear direction of the air cleaner box.

In the air cleaner structure of the saddle-ride type vehicle described above, the air cleaner box may be disposed between left and right frames of a chassis, and both side surfaces of the air cleaner box are separated from the chassis.

In the air cleaner structure of the saddle-ride type vehicle described above, the air cleaner box may have a frontward-narrowing width as seen in a top view.

In the air cleaner structure of the saddle-ride type vehicle described above, a front end of the air cleaner box may be positioned to overlap with the cylinder assembly inward of the width direction of the cylinder assembly as seen in a top view.

In the air cleaner structure of the saddle-ride type vehicle described above, the air cleaner box may have a rearward-narrowing width as seen in a top view.

In the air cleaner structure of the saddle-ride type vehicle described above, a maximum width of the air cleaner box may be approximately equal to a width of the cylinder assembly.

In the air cleaner structure of the saddle-ride type vehicle described above, the air cleaner box may extend diagonally frontward and upward and have a front surface having a width gradually narrowing frontward, and the front surface may be positioned above the cylinder assembly.

In the air cleaner structure of the saddle-ride type vehicle described above, an air intake passage may be provided in a seat frame that supports a seat, and an air intake duct portion provided in an upper part of the air cleaner box may be connected to the air intake passage. In this case, the air intake passage may have a downward opening provided beneath the seat frame. In addition, a shock absorber serving as a rear wheel suspension may be disposed at the rear of the air intake duct portion above the air cleaner box. Furthermore, an air filter may be disposed in a coupling portion between the air cleaner box and the air intake passage.

In the air cleaner structure of the saddle-ride type vehicle described above, the air cleaner box may be provided with an outlet pipe connected to the cylinder assembly.

DETAILED DESCRIPTION OF THE PREFERRED EMBODIMENTS

Preferred embodiments of the present invention will now be described with reference to the accompanying drawings. Herein, the front, rear, left, and right directions are defined with respect to a rider. The front and rear sides are denoted by "Fr" and "Rr," respectively.

(First Embodiment)

Figure 1:
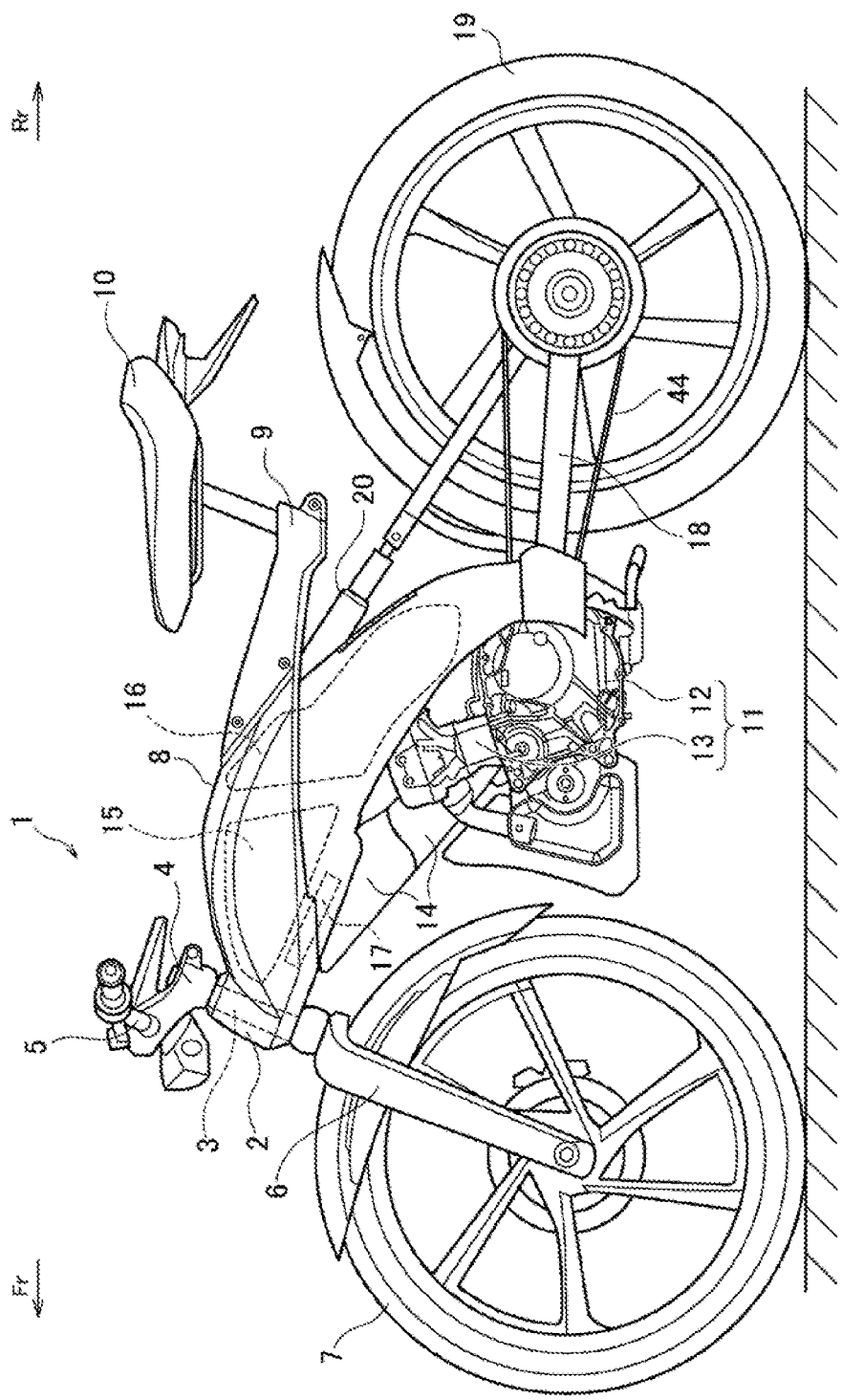
FIG. 1 is a side view illustrating a motorcycle according to a first embodiment of the invention.
Figure 2:
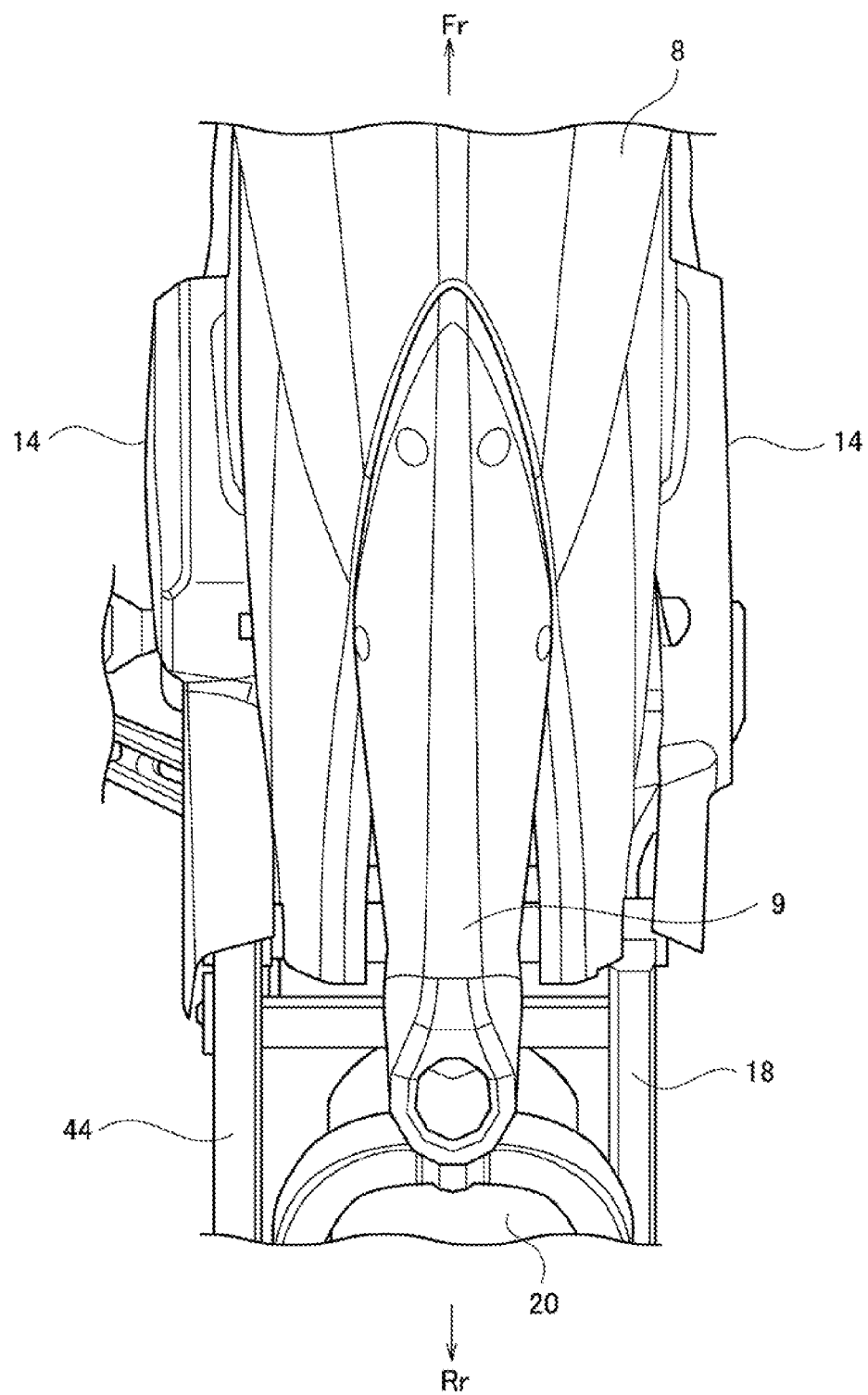
FIG. 2 is a top view illustrating a part of the motorcycle according to the first embodiment of the invention.

FIG. 1 is a side view illustrating a motorcycle 1 as an example of the saddle-ride type vehicle according to the present invention. FIG. 2 is a top view illustrating a part of the motorcycle 1.

In a front part of the motorcycle 1, a steering stem shaft 3 is supported by a steering head pipe 2 pivotably to the left or right. A handle bar 5 is fixed to the top of the steering stem shaft 3 using a top bridge 4. In addition, a front fork 6 is provided in the lower end of the steering stem shaft 3. The front fork 6 extends to the left side of the vehicle and supports a front wheel 7 rotatably in a cantilevered manner. Although not described in detail herein, a shock absorber serving as a front wheel suspension is embedded in the steering stem shaft 3.

The steering head pipe 2 is assembled with a chassis 8 extending diagonally rearward and downward in an arc shape. As illustrated in FIG. 2, the left and right frames of the chassis 8 are connected to each other on the top at the rear of the steering head pipe 2 to form an integral shape. Then, the chassis 2 is opened on its top and branches to the left and right.

A seat frame 9 is supported by the chassis 8. The seat frame 9 is connected to the V-shaped portion branching to the left and right of the chassis 8 and extends rearward to support a seat 10.

A single-cylinder engine (internal combustion engine) unit 11 is mounted on the chassis 8. The engine unit 11 has a crankcase 12 and a cylinder assembly 13 protruding diagonally frontward and upward from the crankcase 12. Note that the left and right sides of the engine unit 11 are covered by a fairing 14 provided to extend diagonally rearward and downward (in FIG. 1, the engine unit 11 is illustrated in a visible state by partially cutting out the left fairing 14).

A fuel tank 15 is disposed at the rear of the steering head pipe 2 inside the chassis 8 above the engine unit 11. In addition, an air cleaner box 16 is disposed at the rear of the fuel tank 15. Furthermore, an electronic control unit (ECU) 17 capable of controlling the engine is disposed below the fuel tank 15.

In the rear parts of the left and right frames of the chassis 8, swing arms 18 are supported swingably, so that a rear wheel 19 is rotatably supported by the rear ends of the swing arms 18. A rear wheel suspension including a shock absorber 20 is suspended between the chassis 8 and the swing arms 18. The rear wheel 19 is rotatably driven by a driven sprocket where a belt 44 for transmitting the engine power is looped An air cleaner structure according to an embodiment of the invention will now be described in detail.

Figure 3:
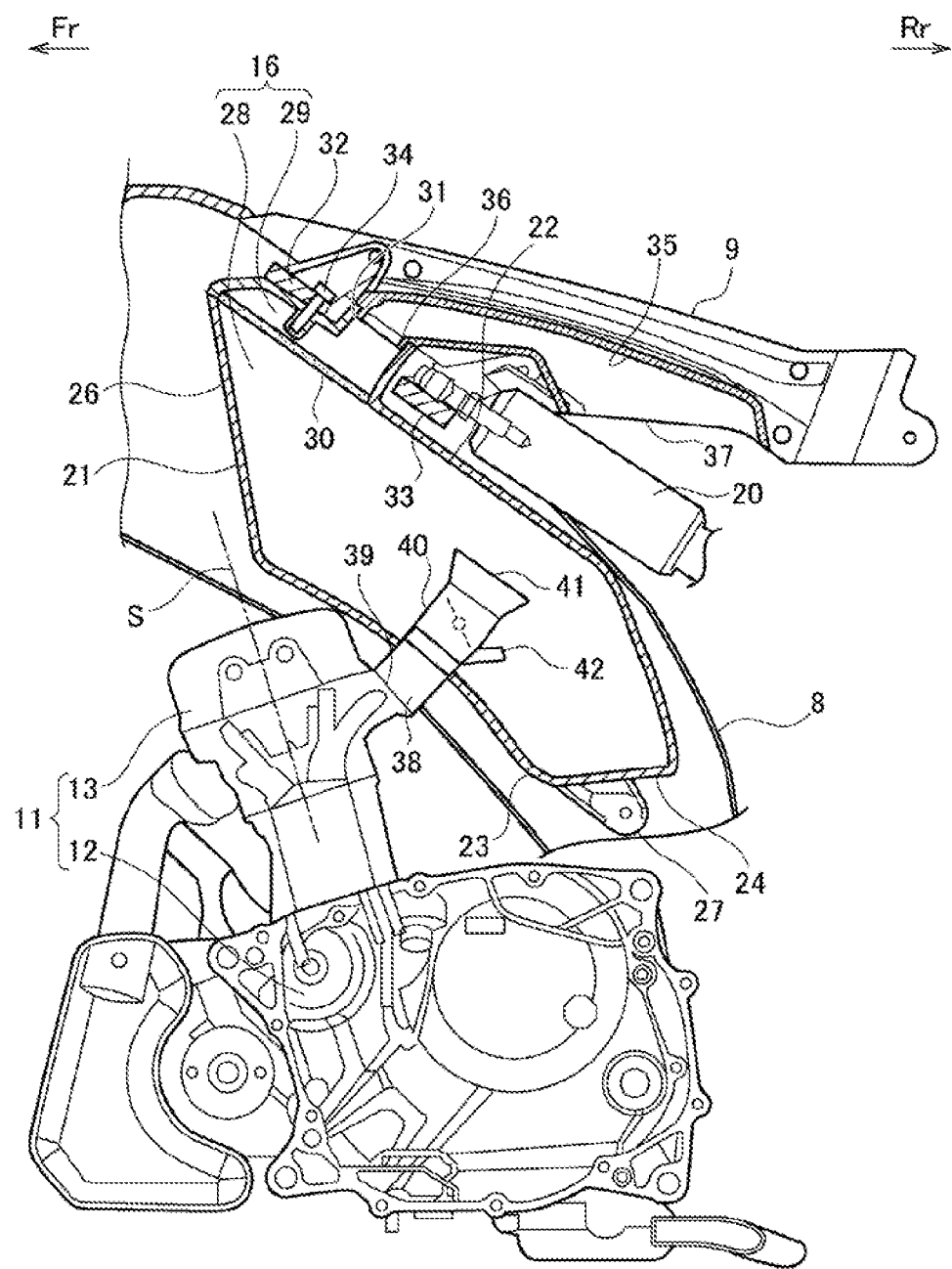
FIG. 3 is a side view (partial cross-sectional view) illustrating a configuration of an air cleaner box of the motorcycle and the surroundings thereof according to the first embodiment of the invention.
Figure 5A:
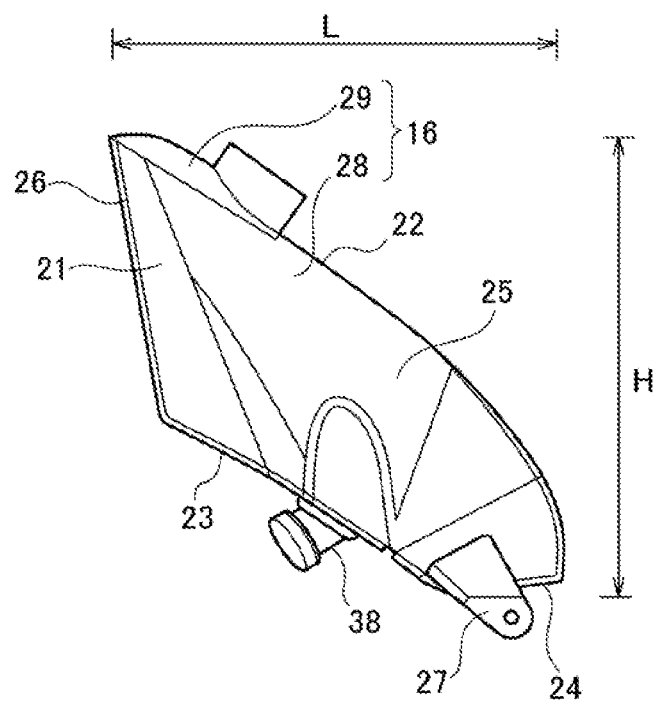
FIG. 5A is a side view illustrating the air cleaner box.
Figure 5B:
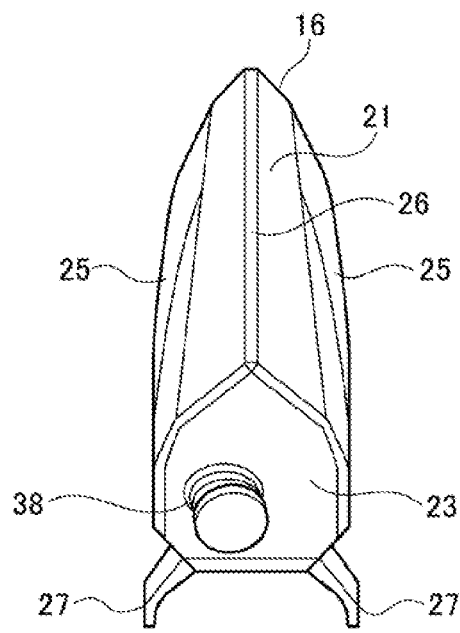
FIG. 5B is a front view illustrating the air cleaner box.

As illustrated in FIGS. 3 and 5A, the air cleaner box 16 has a rearward-descending shape extending from the upper side to the rear side of the cylinder assembly 13 of the engine unit 11 as seen in a side view. The air cleaner box 16 is disposed between the left and right frames of the chassis 8 along the chassis 8 as seen in the side view. As illustrated in FIG. 5A, a maximum height H of the air cleaner box 16 (excluding a bracket portion 27 that does not contribute to the box capacity) is set to be equal to or larger than a maximum length L of the front-rear direction.

More specifically, the air cleaner box 16 includes, as seen in the side view, a front surface 21 extending diagonally frontward and upward, an upper surface 22 extending rearward and downward from the top portion of the front surface 21, a lower surface 23 extending rearward and downward from the lower portion of the front surface 21, and a rear surface 24 that links the upper and lower surfaces 22 and 23. The space surrounded by those surfaces 21, 22, 23, and 24 is enclosed by left and right side surfaces 25 to form a box shape. The front surface 21 has an acute shape having a frontward-narrowing width and is positioned above the cylinder assembly 13. In this case, as illustrated in FIG. 3, a contour line 26 of the front end (the tip of the front surface 21) is positioned approximately in parallel with a cylinder axial line S above the cylinder assembly 13 as seen in the side view. Note that the "approximately parallel" does not mean "perfectly parallel," but means that an angle between the extension of the contour line 26 and the cylinder axial line S may be smaller than 45°.

Each of left and right bracket portions 27 protruding from the rear parts of each side surface 25 of the air cleaner box 16 is fixed to the chassis 8.

Figure 4:
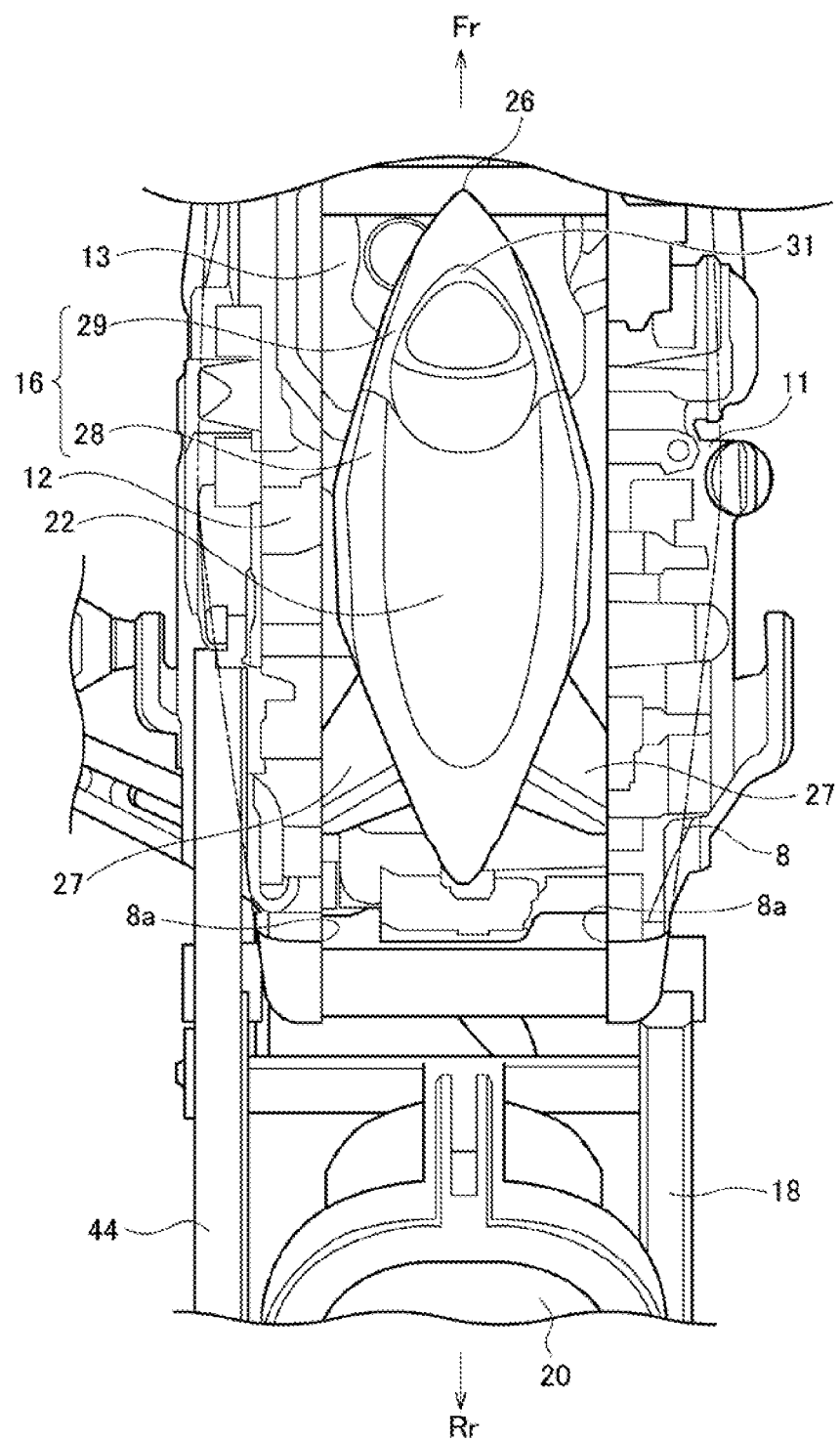
FIG. 4 is a top view illustrating a configuration of the air cleaner box of the motorcycle and the surroundings thereof according to the first embodiment of the invention.

The air cleaner box 16 configured in this manner is disposed such that both the side surfaces 25 are separated from the chassis 8 as illustrated in FIG. 4. Note that the internal side surface 8a of the chassis 8 is indicated by the solid line in FIG. 4.

The air cleaner box 16 has a frontward-narrowing width, that is, a tapered shape having a width gradually narrowing frontward as seen in a top view. In this case, the left and right parts of the frontward-narrowing shape are symmetric to each other, and the front end of the air cleaner box 16 is approximately centered in the vehicle width direction. In addition, the front end of the air cleaner box 16 is positioned to overlap with the cylinder assembly 13 inward of the width direction of the cylinder assembly 13 as seen in the top view.

The air cleaner box 16 has a rearward-narrowing width, that is, a tapered shape having a width gradually narrowing rearward as seen in the top view.

The center portion of the front-rear direction of the air cleaner box 16 has a maximum width which is approximately equal to the width of the cylinder assembly 13.

As illustrated in FIGS. 3 and 5A, the air cleaner box 16 has a vertically dividing structure in the upper front part, including a box body portion 28 and a cap portion 29. The dividing structure has a dividing surface linked to the upper surface 22, and an air filter (an air cleaner element) 30 is disposed on the dividing surface. Since the air filter 30 is disposed on the dividing surface in this manner, it is possible to easily replace the air filter 30. A part of the cap portion 29 protrudes upward and is used as an air intake duct portion 31.

Here, as illustrated in FIG. 3, front and rear brackets 32 and 33 are disposed by interposing the air intake duct portion 31. Each bracket 32 and 33 is disposed between the left and right frames of the chassis 8. The front bracket 32 supports the seat frame 9 in an upward protruding support portion and supports the air cleaner box 16 by installing a bolt 34. The rear bracket 33 supports the seat frame 9 in an upward protruding support portion and supports the shock absorber 20. The shock absorber 20 is arranged along the upper surface 22 of the air cleaner box 16 at the rear of the cap portion 29 and extends diagonally rearward and downward. Since the air intake duct portion 31 of the air cleaner box 16 and the shock absorber 20 are arranged to neighbor each other in the front-rear direction in this manner, it is possible to closely arrange both the air cleaner box 16 and the shock absorber 20 above the engine unit 11. Therefore, it is possible to obtain a sufficient box capacity and guarantee the degree of freedom in arrangement of the shock absorber 20 while maintaining air cleaner performance.

Further, for placement of the shock absorber 20, the upper surface 22 of the air cleaner box 16 has a concave shape in which the rear part is stepped down relative to the front part (where the cap portion 29 is provided). Similarly, in this case, the air intake duct portion 31 of the air cleaner box 16 and the shock absorber 20 are arranged to neighbor each other in the front-rear direction. Therefore, it is possible to suppress degradation of the air cleaner performance without hindering an aerodynamic flow of the intake air and reducing an aspect ratio of the air cleaner box 16.

An air intake passage 35 extending in the front-rear direction is provided in the seat frame 9 and is connected to the air intake duct portion 31 of the air cleaner box 16. For example, a tubular portion 36 is provided in an outlet port of the air intake passage 35 and is fitted to the inside of the opening of the air intake duct portion 31 to obtain airtightness. In addition, a downward opening 37 of the air intake passage 35 is formed beneath the seat frame 9, so that the external air is introduced from the opening 37 to the air cleaner box 16 through the air intake passage 35 and the air intake duct portion 31. Note that, although the air intake passage 35 and the opening 37 are hatched on their cross sections in FIG. 3 in order to distinguish them from the surroundings, any cross-sectional shape may be employed in practice.

The lower surface 23 of the air cleaner box 16 is provided with an outlet pipe 38 connected to the cylinder assembly 13 to supply a gas mixture. As seen in the side view, the lowermost part of the air cleaner box 16 is positioned lower than the intake port 39 of the cylinder assembly 13, and the outlet pipe 38 is approximately centered in the front-rear direction of the lower surface 23. The outlet pipe 38 is assembled to obliquely penetrate the lower surface 23 and extends diagonally frontward and downward approximately at an angle of 45°. The outlet pipe 38 is connected to the intake port 39 of the cylinder assembly 13.

Since the air cleaner has a vertically elongating shape, it is possible to increase an aspect ratio of the air cleaner box 16 with respect to an opening area of the outlet pipe 38 and effectively suppress an intake booming noise. In addition, since the outlet pipe 38 is assembled to the air cleaner box 16 at an appropriate angle, it is possible to reduce bending of the outlet pipe 38 and improve intake efficiency.

Inside the air cleaner box 16, the outlet pipe 38 is connected to a throttle body 40 and a funnel 41, and a fuel injector 42 is provided in the downstream side from the throttle valve in the throttle body 40. In this manner, the throttle body 40 and the fuel injector 42 are disposed inside the air cleaner box 16. Therefore, it is possible to arrange the air cleaner box 16 and the cylinder assembly 13 to closely neighbor each other. Therefore, it is possible to increase a size of the air cleaner box 16.

As described above, the air cleaner box 16 has a rearward-descending shape extending from the upper side to the rear side of the cylinder assembly 13 as seen in the side view to form a vertically elongating box shape. Therefore, it is possible to arrange the air cleaner box 16 by effectively using the space from the upper side to the rear side of the cylinder assembly 13 in the center of the front-rear direction of the chassis. As a result, it is possible to obtain a sufficient box capacity and facilitate a compact design.

Furthermore, it is possible to increase the aspect ratio of the air cleaner box 16 with respect to the funnel 41 and improve silencing performance.

The air cleaner box 16 has a frontward-narrowing width as seen in the top view, and both the side surfaces 25 of the air cleaner box 16 are separated from the chassis 8. Therefore, it is possible to smoothly flow the air stream in the lateral sides of the air cleaner box 16. As a result, it is possible to prevent heat accumulation on the cylinder assembly 13 and turbulence in the air stream behind the cylinder assembly 13. In this case, the frontward-narrowing shape is formed symmetrically between the left and right sides, and the front end of the air cleaner box 16 is approximately centered in the vehicle width direction. Therefore, it is possible to divide the air stream into equal halves between the left and right sides.

Since the air cleaner box 16 has a rearward-narrowing width as seen in the top view, it is possible to smoothly discharge the air stream flowing through the lateral sides of the air cleaner box 16 backward.

A spacing between the side surfaces 25 of the air cleaner box 16 and the chassis 8 is changed from wide, to narrow, and then, to wide from the front side to the rear side. Therefore, it is possible to increase a flow velocity of the air stream and more smoothen the air stream.

The maximum width of the air cleaner box 16 is approximately equal to the width of the cylinder assembly 13. That is, the width of the portion of the air cleaner box 16 placed at the rear of the cylinder assembly 13 is approximately equal to the width of the cylinder assembly 13. Therefore, it is possible to prevent turbulence behind the cylinder assembly 13 by flowing the air stream flowing through the lateral sides of the cylinder assembly 13 to the lateral sides of the air cleaner box 16.

Since the air intake passage 35 is provided in the seat frame 9, it is possible to effectively use the internal space of the seat frame 9 and obtain a sufficient box capacity. In addition, by using the seat frame 9 having high strength and high rigidity as an air cleaner component, it is possible to provide excellent silencing performance against the intake booming noise. Furthermore, since the seat frame 9 is provided with the downward opening 37 of the air intake passage 35, it is possible to prevent intrusion of a foreign object or water.

(Second Embodiment)

Next, a second embodiment of the invention will be described. In the following description, only a part different from that of the first embodiment will be described, and other parts similar to those of the first embodiment will not be described.

Figure 6:
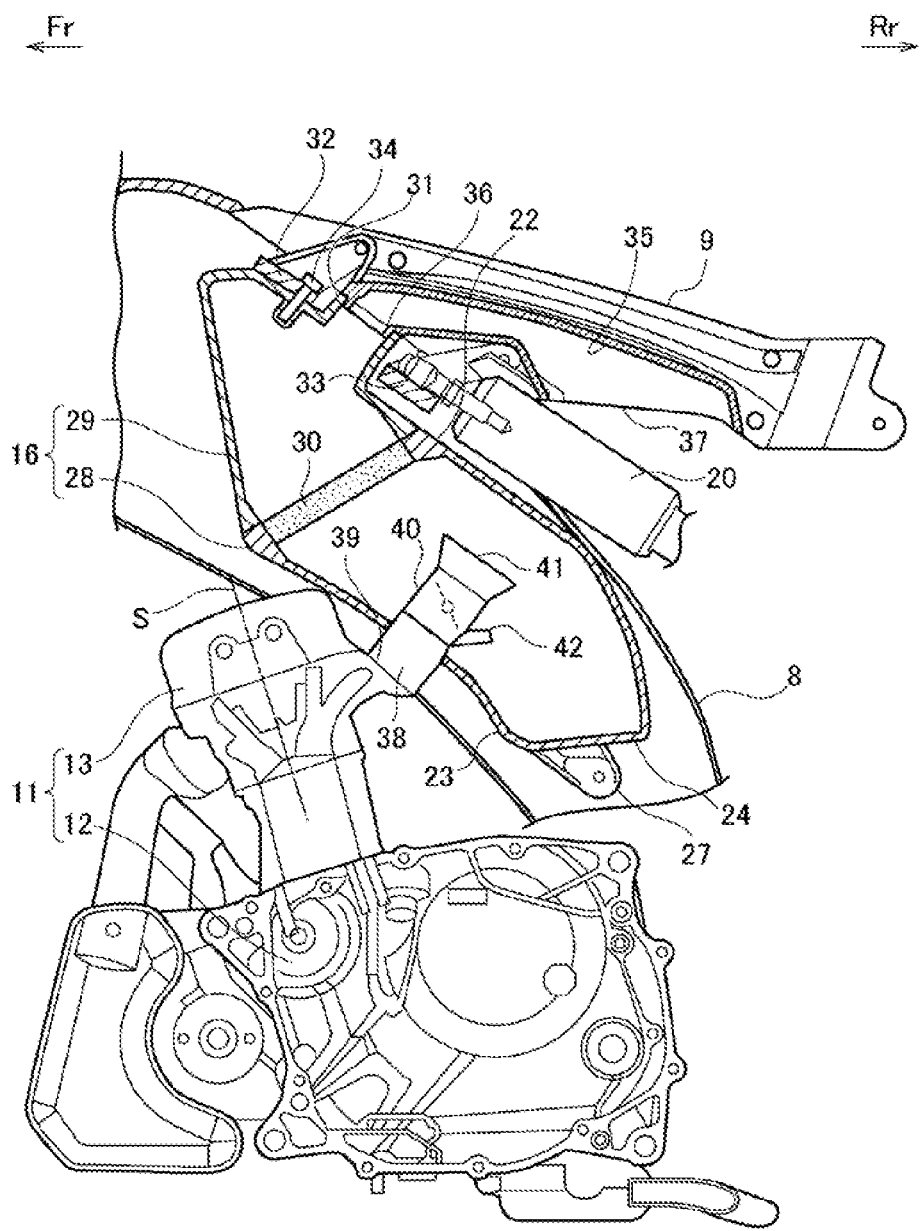
FIG. 6 is a side view (partial cross-sectional view) illustrating a configuration of the air cleaner box of the motorcycle and the surroundings thereof according to a second embodiment of the invention.

According to the second embodiment, as illustrated in FIG. 6, the entire shape of the air cleaner box 16 is similar to that of the first embodiment. However, a position of the dividing surface and a position of the air filter are changed. According to the second embodiment, the dividing surface includes a boundary between the front and lower surfaces 21 and 23 and an intermediate portion of the upper surface 22 in the front-rear direction in order to divide into the box body portion 28 and the cap portion 29 in the front-rear direction. The air filter 30 is disposed on this dividing surface. Compared to the first embodiment, it is possible to increase the area of the dividing surface and install the air filter 30 having a larger size.

(Third Embodiment)

Next, a third embodiment will be described. In the following description, only a part different from that of the first embodiment will be described, and other parts similar to those of the first embodiment will not be described.

Figure 7:
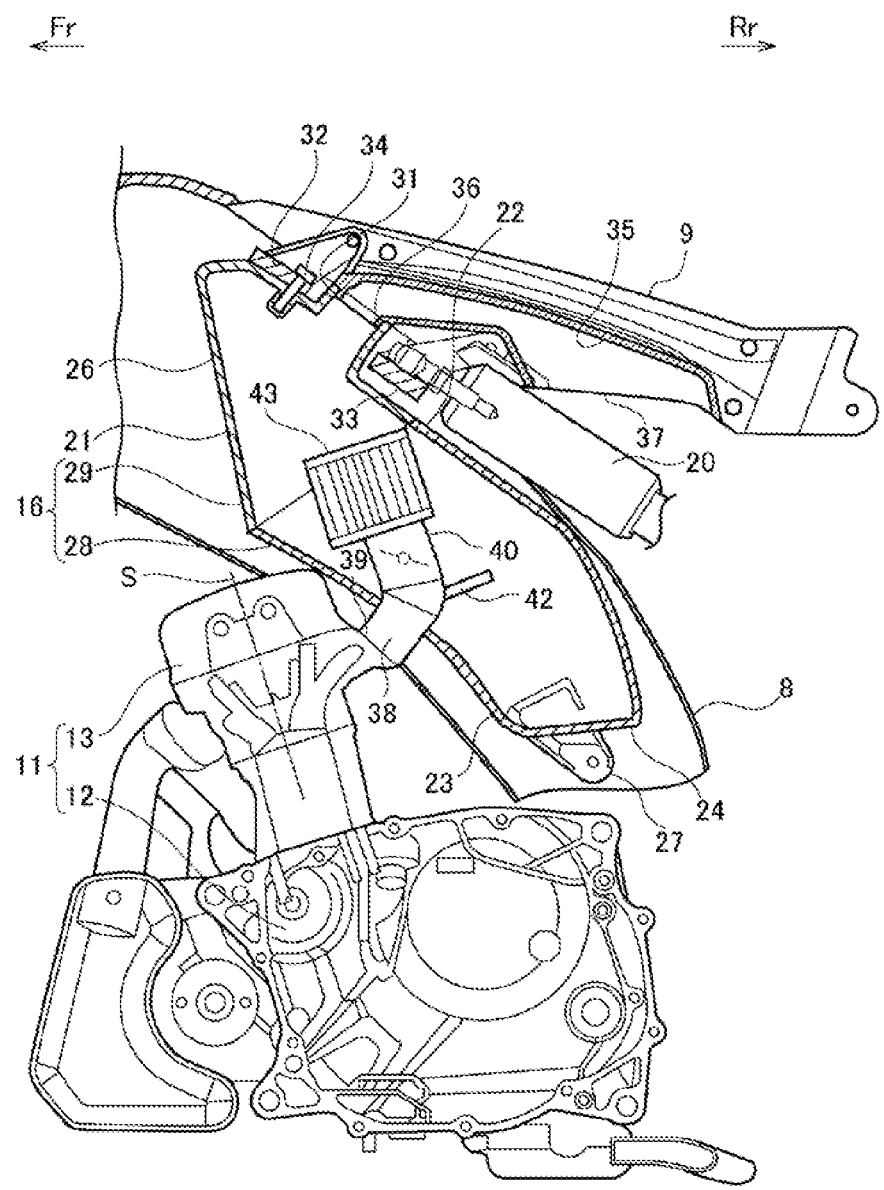
FIG. 7 is a side view (partial cross-sectional view) illustrating a configuration of the air cleaner box of the motorcycle and the surroundings thereof according to a third embodiment of the invention.

According to the third embodiment, as illustrated in FIG. 7, the entire shape of the air cleaner box 16 is similar to that of the first embodiment. However, a position of the dividing surface and a position of the air filter are changed. According to the third embodiment, the outlet pipe 38 is curved to extend diagonally frontward and upward inside the air cleaner box 16. Similar to the first embodiment, the outlet pipe 38 is connected to the throttle body 40 where the fuel injector 42 is provided. However, a tubular air filter unit 43 is provided. Note that the dividing surface of the air cleaner box 16 is similar to that of the second embodiment, but the area of the dividing surface is larger. Therefore, it is possible to easily replace the air filter unit 43.

(Fourth Embodiment)

Next, a fourth embodiment will be described. In the following description, only a part different from that of the first embodiment will be described, and other parts similar to those of the first embodiment will not be described.

Figure 8:
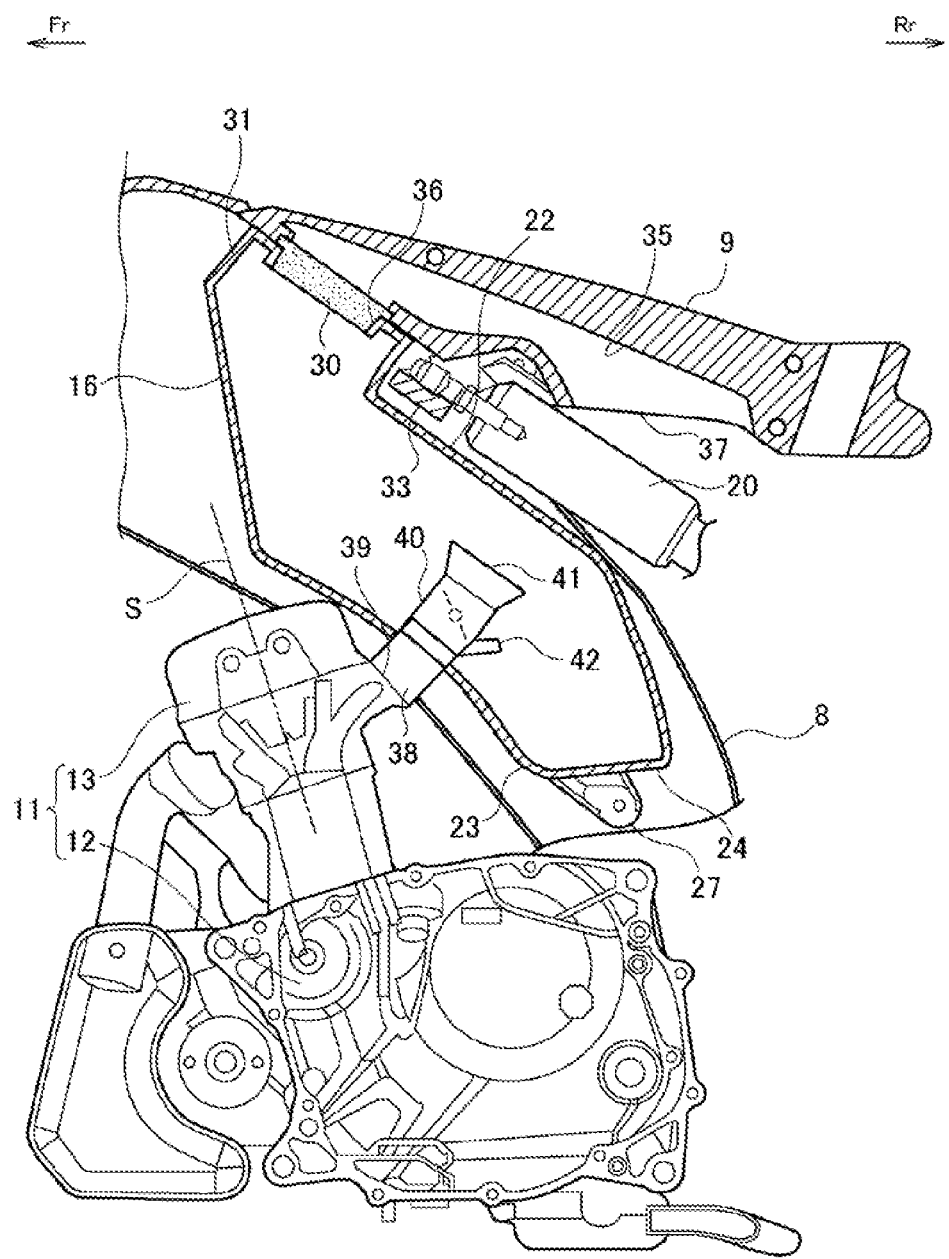
FIG. 8 is a side view (partial cross-sectional view) illustrating a configuration of the air cleaner box of the motorcycle and the surroundings thereof according to a fourth embodiment of the invention.

According to the fourth embodiment, as illustrated in FIG. 8, the air cleaner box 16 does not have a dividing structure. In addition, an air filter 30 is disposed in a coupling portion between the air intake passage 35 of the seat frame 9 and the air intake duct portion 31 of the air cleaner box 16. According to the fourth embodiment, it is possible to increase a capacity of a clean side. In addition, it is possible to immediately access the air filter 30 by removing the seat frame 9 and easily replace the air filter 30.

According to the fourth embodiment, in order to obtain a sufficient area of the air filter 30, the bracket 32 in front of the air intake duct portion 31 of the first to third embodiments is removed. Using that space, the area of the coupling portion between the air intake passage 35 and the air intake duct portion 31 increases. Note that, although not illustrated in detail, brackets may be provided, for example, in the left and right frames of the chassis 8, so that the seat frame 9 is supported by the left and right brackets.

While preferred embodiments of the invention have been described and illustrated hereinbefore, it should be understood that they are only for exemplary purposes and are not to be construed as limitations, and any addition, omission, substitution, or modification may be possible without departing from the spirit or scope of the present invention.

For example, although the throttle body 40 and the fuel injector 42 are provided inside the air cleaner box 16 by way of example in the aforementioned embodiments, they may be provided outside the air cleaner box 16, that is, between the air cleaner box 16 and the cylinder assembly 13. In this case, it is necessary to separate the lower surface of the air cleaner box 16 and the cylinder assembly 13 from each other as much as the spaces of the throttle body 40 and the fuel injector 42. In this regard, a fairing may be provided to link to the left and right side surfaces of the air cleaner box 16 and extend toward the cylinder assembly 13, so that the left and right sides of the throttle body 40 or the fuel injector 42 are preferably covered. As a result, it is possible to avoid degradation of appearance and prevent turbulence of the air stream between the cylinder assembly 13 and the air cleaner box 16. Therefore, it is possible to smoothly flow the air stream in the lateral sides of the cylinder assembly 13 and the air cleaner box 16.

Although a motorcycle has been described as a saddle-ride type vehicle in the aforementioned embodiment, the present invention may be employed in a three-wheeled or four-wheeled vehicle without limiting to the motorcycle.

According to the present invention, it is possible to effectively use the space from the upper side to the rear side of the cylinder assembly to dispose the air cleaner box. Therefore, it is possible to obtain a sufficient box capacity and facilitate a compact design.

What is claimed is:

1. An air cleaner structure of a saddle-ride type vehicle having an engine unit provided with a crankcase and a cylinder assembly protruding diagonally frontward and upward from the crankcase and is mounted to the saddle-ride type vehicle,
    comprising an air cleaner box comprising: a rearward-descending shape extending from a space of an upper side of the cylinder assembly to a space of a rear side of the cylinder assembly and an upper side of the crankcase as seen in a side view,
    an outlet pipe provided in the air cleaner box and connected to the cylinder assembly to supply a gas mixture,
    wherein a lowermost part of the air cleaner box is positioned lower than an intake port of the cylinder assembly,
    the outlet pipe extends frontward from the air cleaner box and is connected to the intake port, and
    a maximum height of the air cleaner box is equal to or larger than a maximum length of a front-rear direction of the air cleaner box.

2. The air cleaner structure of the saddle-ride type vehicle according to claim 1, wherein the air cleaner box is disposed between left and right frames of a chassis, and
    both side surfaces of the air cleaner box are separated from the chassis.

3. The air cleaner structure of the saddle-ride type vehicle according to claim 1, wherein the air cleaner box has a frontward-narrowing width as seen in a top view.

4. The air cleaner structure of the saddle-ride type vehicle according to claim 1, wherein a front end of the air cleaner box is positioned to overlap with the cylinder assembly inward of the width direction of the cylinder assembly as seen in a top view.

5. The air cleaner structure of the saddle-ride type vehicle according to claim 1, wherein the air cleaner box has a rearward-narrowing width as seen in a top view.

6. The air cleaner structure of the saddle-ride type vehicle according to claim 1, wherein a maximum width of the air cleaner box is approximately equal to a width of the cylinder assembly.

7. The air cleaner structure of the saddle-ride type vehicle according to claim 1, wherein the air cleaner box extends diagonally frontward and upward and has a front surface having a width gradually narrowing frontward, and
    the front surface is positioned above the cylinder assembly.

8. The air cleaner structure of the saddle-ride type vehicle according to claim 1, wherein an air intake passage is provided in a seat frame that supports a seat, and
    an air intake duct portion provided in an upper part of the air cleaner box is connected to the air intake passage.

9. The air cleaner structure of the saddle-ride type vehicle according to claim 8, wherein the air intake passage has a downward opening provided beneath the seat frame.

10. The air cleaner structure of the saddle-ride type vehicle according to claim 8, wherein a shock absorber serving as a rear wheel suspension is disposed at the rear of the air intake duct portion above the air cleaner box.

11. The air cleaner structure of the saddle-ride type vehicle according to claim 8, wherein an air filter is disposed in a coupling portion between the air cleaner box and the air intake passage.

12. The air cleaner structure of the saddle-ride type vehicle according to claim 1, wherein the air cleaner box is provided with an outlet pipe connected to the cylinder assembly.

* * * * *